United States Patent Office 3,394,138
Patented July 23, 1968

3,394,138
MANUFACTURE OF 3-OXOGLUTARIMIDES
Ronald H. Meen and James C. Martin, Kingsport, Tenn.,
assignors to Eastman Kodak Company, Rochester, N.Y.,
a corporation of New Jersey
No Drawing. Filed Dec. 20, 1965, Ser. No. 515,240
4 Claims. (Cl. 260—281)

ABSTRACT OF THE DISCLOSURE 3-oxoglutarimides and related compounds, e.g., 3-oxo-thioglutarimides and 3-oxoiminoglutarimides are prepared by heating an azinedione at a temperature of 400° C. to 700° C. or by contacting the azinedione with a basic material at a temperature of 0° C. to 450° C.

---

This invention relates to a novel method for preparing 3-oxoglutarimides and derivatives thereof. More specifically, it relates to a method for preparing 3-oxoglutarimides and derivatives thereof by the isomerization of azinediones.

3-oxoglutarimides are known compounds. Helmut Rohnert, Chem. Ber., 90, 118 (1957) and Joseph Redel et al., Bull. Soc. Chim. France, 1641 (1959), describe certain 3-oxoglutarimides. British Patent No. 851,674 describes substituted 3-oxoglutarimides and a method for their preparation. Rohnert describes the synthesis of 2,2,4-trialkyl-3-oxoglutarimides from the corresponding dialkylcyanoacetylmalonic esters. Redel et al. describes a synthesis similar to that of Rohnert and reports that the 2,2,4-trialkyl-3-oxoglutarimides are completely enolized. The British patent describes the compound 2,4,6-trioxopiperidine and the method for preparing it.

An object of this invention is to provide a new method for preparing 3-oxoglutarimides, oxothioglutarimides or 2,4-dioxo-6-thioketopiperidines and oxoiminoglutarimides or 2,4-dioxo-6-iminopiperidines all of which, for simplicity, are referred to herein as oxoglutarimides.

Another object is to provide a method for preparing 3-oxoglutarimides and derivatives by isomerizing certain azinediones.

The objects of this invention are carried out by heating the particular azinedione or by using a catalyst to effect the rearrangement of its molecular structure to form 3-oxoglutarimides and derivatives.

The azinediones used in this invention have the following formula:

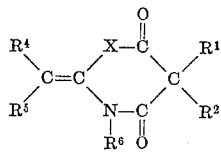

wherein X is selected from the group consisting of oxygen, sulfur and an imino radical of the formula

wherein the substituent $R^3$ is selected from the group consisting of hydrogen, alkyl, preferably having 1 to 8 carbon atoms, and mononuclear aryl having 6 to 10 carbon atoms; each of the substituents $R^1$ and $R^2$, when taken singly, is selected from the group consisting of alkyl and mononuclear aryl having 6 to 10 carbon atoms; each of the substituents $R^4$ and $R^5$, when taken singly, is selected from the group consisting of hydrogen, halogen, hydrocarbon aliphatic having from 1 to 8 carbon atoms and mononuclear aryl having 6 to 10 carbon atoms; $R^6$, when taken singly, is hydrogen, alkyl, preferably having 1 to 12 carbon atoms, mononuclear aryl having 6 to 10 carbon atoms or an acyl of the formula

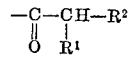

$R^5$ and $R^6$, when taken collectively with the carbon and nitrogen atoms to which they are attached, represent joined alkylene groups completing a heterocyclic ring of 4 to 6 ring atoms; $R^1$ and $R^2$, when taken collectively with the carbon atom to which they are attached, represent joined alkylene groups completing a carbocyclic ring of 4 to 6 ring carbon atoms; and $R^4$ and $R^5$, when taken collectively with the carbon atom to which they are attached, represent joined alkylene groups completing a carbocyclic ring of 4 to 6 ring carbon atoms.

The 3-oxoglutarimides that are formed may be represented by the following equation:

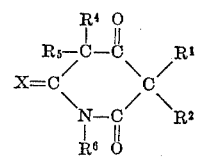

wherein $R^1$, $R^2$, $R^4$, $R^5$, $R^6$ and X respectively are as previously described.

In the special instances where at least one of $R^4$ or $R^5$ is hydrogen, the 3-oxoglutarimide usually exists in the enolic form. The following equation represents the particular structure that is formed by isomerization of the azinediones.

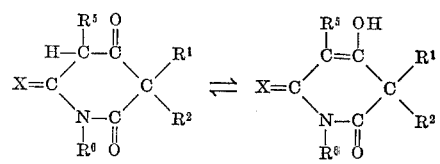

Especially preferred as the azinedione reactants in the process of our invention are those in which the substituent X is oxygen or sulfur, i.e., those of the formula:

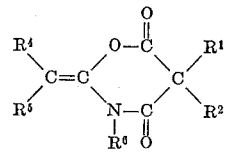

or the formula:

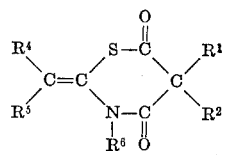

in which $R^1$, $R^2$, $R^4$, $R^5$ and $R^6$ are as defined hereinbefore. The products obtained when these preferred azinedione reactants are employed can be represented by the formula:

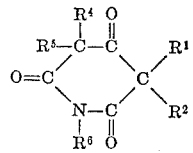

or

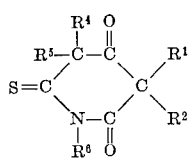

respectively, in which each of $R^1$, $R^2$, $R^4$, $R^5$ and $R^6$ are as defined hereinbefore.

The process for isomerizing azinediones may be carried out either with or without a catalyst. Suitable catalysts consist of any basic material such as sodium hydroxide, sodium hydride, sodium methoxide, magnesium oxide, calcium oxide, potassium carbonate, potassium acetate, tertiary amines, quarternary ammonium compounds, sodium isobutyrate, alumina, silica, zirconia and combinations of such materials. Natural occurring materials such as montmorillonite clays are also suitable.

Temperatures suitable for the isomerization or rearrangement process range from 0–700° C. To accomplish the rearrangement when a catalyst is not used, higher temperatures are required than when a basic catalyst is used—i.e., about 400° C. to 700° C. When basic catalysts are used the lower portion of the temperature range is satisfactory—i.e., about 0° C. to 450° C.

The isomerization process may be carried out either in bulk operations or by a continuous process. The bulk process comprises heating a single quantity of the azinediones or contacting a single quantity of the azinedione with the basic catalyst and then isolating the product. In a continuous process, the material to be isomerized is continuously passed through a heated chamber or is continuously contacted with a basic catalyst. The azinedione can also be heated as it is contacted with the basic catalyst. Thus, in the bulk process, the azinedione can be heated while in contact with the basic catalyst and, in the continuous process, the azinedione can be passed through a heated chamber which is packed with the basic catalyst.

The 3-oxoglutarimides are known compounds which possess sedative, anticonvulsive and hypnotic properties which make them useful in human and veterinary medicines. They also may be employed as starting materials for the preparation of other active compounds as shown in British Patent 851,674.

Example 1

(a) 3 - butyldihydro-2-isopropylidene-5,5-dimethyl-4H-1,3-oxazine-4,6(5H)-dione (48 g.) was added during 7 hrs. to the top of an upright pyrolysis tube, 1″ in diameter, packed with a 10″ section of Vycor brand quartz chips, maintained at 590–620° C. by a furnace and swept by a 9 cc. per min. flow of pure nitrogen. The collected pyrolysate (43.6 g.) was distilled through a 6″ packed column to give 32.8 g. (68%) of N-butyl-2,2,4,4-tetramethyl-3-oxoglutarimide, B.P. 132–140° C. (10 mm.), $n_D^{20}$ 1.4718.

*Analysis.*—Calcd. for $C_{13}H_{21}NO_3$: C, 65.24; H, 8.85; N, 5.85; mol. wt., 239. Found: C, 65.45; H, 8.85; N, 5.64; mol. wt. 235 The n.m.r. spectrum of this material is in complete agreement with the structure assigned.

(b) Under an atmosphere of pure nitrogen, 3-butyldihydro - 2 - isopropylidene-5,5-dimethyl-4H-1,3-oxazine-4,6 (5H)-dione (2 g.) was refluxed for 30 min. at approximately 280° C. over anhydrous potassium carbonate (0.2 g.). Gas liquid chromatography showed complete conversion to N-butyl-2,2,4,4-tetramethyl-3-oxoglutarimide. The infrared spectrum showed the product to be identical with that from Example 1(a).

(c) A solution of 3-butyldihydro-2-isopropylidene-5,5-dimethyl-4H-1,3-oxazine-4,6-(5H)-dione (2 g.) in toluene (8 ml.) was refluxed under an atmosphere of nitrogen with sodium methoxide (0.1 g.) for 15 min. Gas liquid chromatography showed complete conversion to N-butyl-2,2,4,4-tetramethyl-3-oxoglutarimide, which was also identified by the infrared spectrum.

(d) A mixture of 3-butyldihydro-2-isopropylidene-5,5-dimethyl-4H-1,3-oxazine-4,6-(5H)-dione (2 g.) and sodium methoxide (0.15 g.) was stirred under nitrogen for 20 hrs. at 25° C. Gas liquid chromatography showed complete conversion to N-butyl-2,2,4,4-tetramethyl-3-oxoglutarimide which was also identified by the infrared spectrum.

The following equation illustrates the rearrangement that took place in Examples 1(a), 1(b), 1(c) and 1(d).

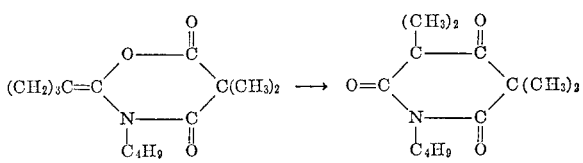

Example 2

(a) Dihydro - 2-isopropylidene-3,5,5-trimethyl-4H-1,3-oxazine-4,6(5H)-dione (33 g.) was added during 7 hrs. to the top of an upright pyrolysis tube, 1″ in diameter, packed with a 10″ section of Vycor brand quartz chips, maintained at 590–620° C. by a furnace and swept by a 9 cc. per min. flow of pure nitrogen. The collected semi-solid pyrolysate (31 g.) was distilled at 82–90° C. (1 mm.) and crystallized from toluene to give 22.3 g. (68%) of N,2,2,4,4 - pentamethyl - 3 - oxoglutarimide, M.P. 75.5–76.5° C.

*Analysis.*—Calcd. for $C_{10}H_{15}NO_3$: C, 60.89; H, 7.67; N, 7.10. Found: C, 60.95; H, 7.41; N, 7.17. The n.m.r. spectrum of this material is in complete agreement with the structure assigned.

(b) Dihydro - 2-isopropylidene-3,5,5-trimethyl-4H-1,3-oxazine-4,6(5H)-dione (5 g.) was added during 30 min. to a 1″ diameter pyrolysis tube at 290 to 410° C., containing 4″ of pelleted magnesium oxide and swept with nitrogen at 9 cc. per min. Gas liquid chromatography indicated 66% of recovered starting material and 34% of N,2,2,4,4-pentamethyl-3-oxoglutarimide. When the procedure was repeated at the same temperature in the absence of the basic catalyst, no rearrangement occurred. The following equation illustrates the rearrangement that occurred.

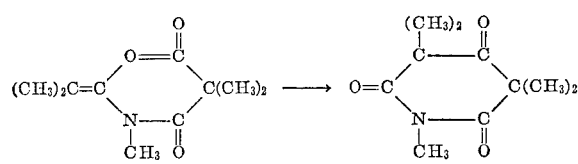

Example 3

2 - ethylidenedihydro - 3,5,5 - trimethyl - 4H - 1,3 - oxazine-4,6(5H)-dione (32 g.) was added during 7 hrs. to the top of an upright pyrolysis tube, 1″ in diameter, packed with a 10″ section of Vycor brand quartz chips, maintained at 635–660° C. by a furnace and swept by a 9 cc. per min. flow of pure nitrogen to give a partially solid pyrolysate. The collected pyrolysate was rapidly distilled at 72–106° C. (0.1 mm.) and crystallized from toluene to give 13.1 g. (41%) of N,2,2,4-tetramethyl-3-oxoglutarimide, M.P. 137–138° C. The n.m.r. spectrum of this material is in complete agreement with the enolic form of the structure assigned. The reaction that occurred is represented by the following equation:

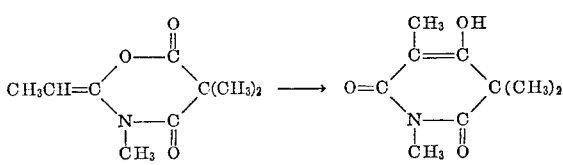

Example 4

The following dihydro-4H-1,3-oxazines-4,6(5H)-diones are rearranged to the respective 3-oxoglutarimides when treated by the general process and conditions of Example 1(c).

| Oxazinedione | Oxoglutarimide |
|---|---|

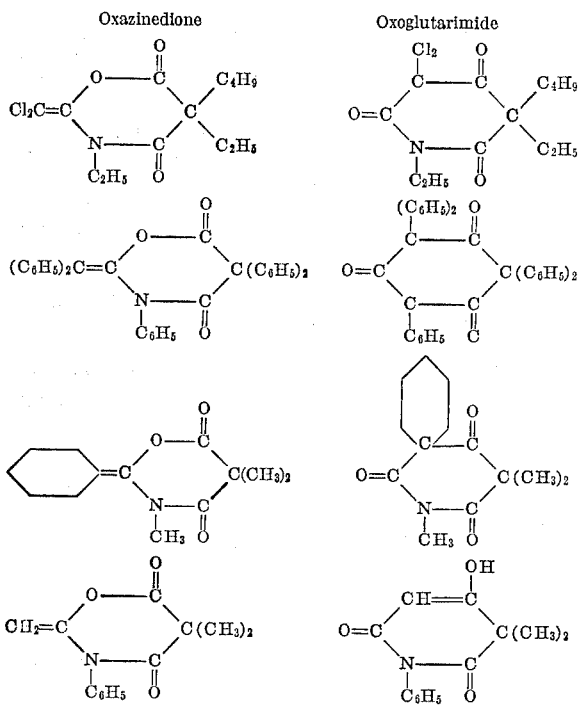

decyl-2,2,4,4-tetramethyl-3-oxoglutarimide, B.P. 160–162° C. (0.07 mm.), $n_D^{20}$ 1.4690. The following equation represents the rearrangement that took place.

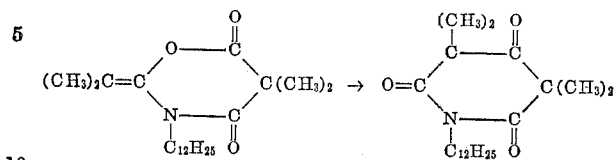

Example 8

A mixture of dihydro-2-isopropylidene-5,5-dimethyl-3-phenyl-4H-1,3-oxazine-4,6(5H)-dione (139 g.), sodium methoxide (8 g.) and toluene (5 ml.) was refluxed for 1.5 hrs. The solvent was removed under vacuum to give 116 g. of 2,2,4,4-tetramethyl-N-phenyl-3-oxoglutarimide, M.P. 94–100° C. A sample for analysis was recrystallized from ethyl alcohol and melted at 100–102° C. The rearrangement that took place is represented by the following equation:

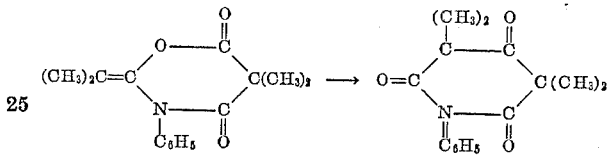

*Analysis.*—Calcd. for $C_{15}H_{17}NO_3$: C, 69.5; H, 6.6; N, 5.4. Found: C, 70.0; H, 6.9; N, 5.0.

Example 9

A solution of 2-benzylidenedihydro-3,5,5-trimethyl-4H-1,3-oxazine-4,6(5H)-dione (60 g.) in benzene (180 ml.) was added during 7 hrs. to the top of an upright pyrolysis tube, 1" in diameter, packed with a 10" section of Vycor brand quartz chips, maintained at 590–620° C. by a furnace swept by a 9 cc. per min. flow of pure nitrogen. The solvent was removed under vacuum and the solid residue was recrystallized from ethyl alcohol to give 40.0 g. of 3-hydroxy-N,4,4-trimethyl-2-phenylglutaconimide, M.P. 145–147° C. The following equation represents the rearrangement that took place.

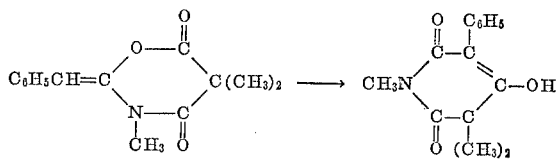

*Analysis.*—Calcd. for $C_{14}H_{15}NO_3$: C, 68.6; H, 6.2; N, 5.7. Found: C, 68.4; H, 6.4; N, 5.8.

Example 5

A mixture of dihydro-2-diphenylmethylidene-3,5,5-trimethyl-4H-1,3-oxazine-4,6(5H)-dione (2.0 g.), sodium (0.2 g.) and toluene (25 ml.) was refluxed for 1 hr. The solvent was removed under vacuum and the solid residue was recrystallized from ethyl alcohol to give 1.1 g. of N,4,4-trimethyl-2,2-diphenyl-3-oxoglutarimide, M.P. 137–138.5° C. The following equation represents the rearrangement that occurred.

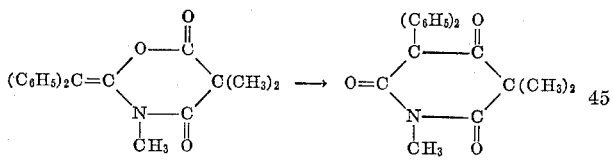

*Analysis.*—Calcd. for $C_{20}H_{19}NO_3$: C, 74.7; H, 6.0; N, 4.4. Found: C, 74.8; H, 6.0; N, 4.1.

Example 6

A mixture of dihydro-3,5,5-trimethyl-2-isopropylidene-4H-1,3-thiazine-4,6(5H)-dione (9 g.), sodium (1 g.) and toluene (20 ml.) was stirred for 5 hrs. at room temperature and refluxed for 5 hrs. Distillation of this mixture through a 6-in. Vigreux column gave 4.4 g. of N,2,2,4,4-pentamethyl-3-oxo-1-thioglutarimide, B.P. 71–75° C. (0.7 mm.). The following example represents the rearrangement that took place.

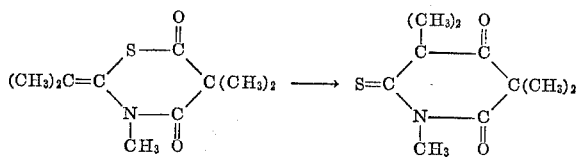

*Analysis.*—Calcd. for $C_{10}H_{15}NO_2S$: C, 56.3; H, 7.1; N, 6.6; S, 15.0. Found: C, 56.9; H, 7.6; N, 6.2; S, 15.0.

Example 7

A mixture of dihydro-3-dodecyl-2-isopropylidene-5,5-dimethyl-4H-1,3-oxazine-4,6(5H)-dione (62 g.), sodium methoxide (3.8 g.) and toluene (75 ml.) was refluxed for 30 min. The mixture was filtered and the filtrate distilled through a 6-in. Vigruex column to give 54 g. of N-do-

Example 10

Under the general conditions of Example 5, the following thiazinediones are isomerized or rearranged to their respective oxothioglutarimide.

| Thiazinedione | Oxothioglutarimide |
|---|---|

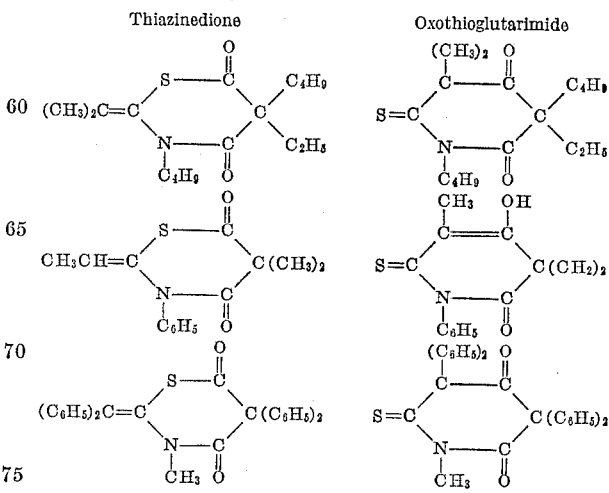

The azinediones which are used in this invention are obtained by mixing a disubstituted malonyl chloride and an amide, thioamide or acetamidine in an inert solvent in the presence of a basic hydrogen chloride acceptor and isolating the product.

More specifically, the certain azinediones are obtained by reacting a compound having the formula

with a disubstituted malonyl chloride having the formula

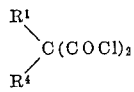

and providing azinediones having the formula

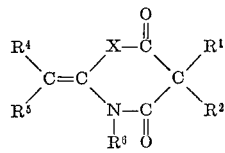

wherein $R^1$, $R^2$, $R^4$, $R^5$, $R^6$ and X are as hereinbefore defined.

The amides, thioamides and acetamidines that are suitable for use in preparing the azinediones used in the present process are well-known compounds that have been prepared by a variety of methods and include the following materials: acetamide, N-methylacetamide, N-butylacetamide, N-octylacetamide, N-methylchloroacetamide, N-ethyldichloroacetamide, N-propylpropionamide, N-butylisobutyramide, N-methylcrotonamide, N-methyl-2-ethylhexamide, N-methyldiphenylacetamide, N,N-dimethyladipamide, N-methylthioisobutyramide, acetanilide, p-methoxyacetanilide, thioacetanilide, isobutyranilide, p-chloroacetanilide, m-nitroacetanilide, 2-pyrrolidinone, acetamidine, dimethylacetamidine, N-phenylacetamidine and N,N'-diphenylacetamidine, etc.

The disubstituted malonyl chlorides that are suitable for preparing the azinediones used in the present process include the following: diphenylmalonyl chloride, dimethylmalonyl chloride, diethylmalonyl chloride, ethylmethylmalonyl chloride, dibutylmalonyl chloride, butylethylmalonyl chloride, methylpropylmalonyl chloride, dioctylmalonyl chloride, dibenzylmalonyl chloride, etc. These compounds may be prepared according to known techniques by reacting the corresponding dialkylmalonic acid with thionyl chloride or a similar chlorinating agent.

In the process for preparing certain azinediones by reacting unsubstituted and N-substituted acetamidines with a disubstituted malonyl chloride, it is preferred but not necessary to use a solvent. Suitable solvents are restricted to materials that do not react with the reagents. Typical classes of solvents include ethers, esters, aliphatic and aromatic hydrocarbons and chlorinated hydrocarbons, nitriles, and certain dipolar aprotic solvents such as dimethylformamide, dimethylacetamide, dimethylsulfoxide, tetramethylene sulfone, propylene carbonate, etc.

In the practice of this process, it is preferred, for best operation, to use a hydrogen chloride acceptor material in the reaction medium to keep the reaction from becoming too acidic. However, the reaction may be operated either using an excess of hydrogen chloride acceptor material in the reaction medium or it may be run in the absence of a hydrogen chloride acceptor. It is preferred to use an anhydrous system. Hydrogen chloride acceptor materials such as triethylamine, trimethylamine, triethylene diamine, 1,4-dimethylpiperazine, tributylamine, pyridine, quinoline and N,N,N',N'-tetramethylethylenediamine may be employed in the anhydrous system. However, an aqueous system using such bases as sodium hydroxide or potassium hydroxide is workable.

The substituted malonyl chloride and a compound selected from the group consisting of unsubstituted and N-substituted amides and thioamides and unsubstituted and N-substituted acetamidines may be added to a suitable solvent and hydrogen chloride acceptor to form a product. However, it is preferred to add the malonyl chloride rapidly to a solution of one of the above noted amides, thioamides or acetamidines, hydrogen chloride acceptor material and a suitable solvent. The molar ratio of the substituted malonyl chloride, to the amide, thioamide or acetamidine and the hydrogen chloride acceptor material is generally 1:1:2–3. Variation of the molar ratio may be practiced.

The temperature of the subject reaction is generally governed by the nature of the reactants with the suitable reaction temperature within the range of from 0° to 200° C.

The following example illustrates a typical method for the preparation of an azinedione useful as a starting material in the process of this invention.

Example 11

Dimethylmalonyl chloride (84.5 g.; 0.5 mole) was added rapidly to a stirred solution of N-methylacetamide (36.5 g.; 0.5 mole) and triethylamine (1.5 mole) in toluene (500 ml.). The reaction temperature rose to 90° C. and a large amount of solid precipitated. After stirring for 2 hrs., the solid was removed by filtration and washed several times with ether. The solid material consisted of 135.3 g. (98.5%) of triethylamine hydrochloride. Distillation of the filtrates through a 6-in. Vigreux column gave 60.5 g. (73%) of dihydro-3,5,5-trimethyl-2-methylene-4H-1,3-oxazine-4,6(5H)-dione, B.P. 78–80° C. (1 mm.).

Analysis.—Calcd. for $C_8H_{11}NO_3$: C, 56.8; H, 6.6; N, 8.3. Found: C,56.9; H, 6.8; N, 8.5. Infrared maxima (neat) at 5.67, 5.9 to 6.15 (broad). N.m.r. (neat): singlet at 1.38 (gem-dimethyl groups), singlet at 3.22 (—N—CH₃), and quartet at 4.28 (CH₂=). The N.m.r. spectrum was recorded on a Varian A–60 instrument operating at 60 mc. Values reported are in p.p.m. (δ) referred to tetramethylsilane as an internal standard.

Although the invention has been described in considerable detail with particular reference to certain preferred embodiments thereof, variations and modifications can be effected within the spirit and scope of the invention as described hereinbefore, and as defined in the appended claims.

We claim:
1. The process which comprises heating an azinedione of the formula:

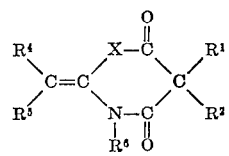

to a temperature of about 400° C. to about 700° C. and obtaining a compound of the formula:

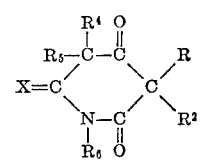

wherein X is oxygen, sulfur or imino of the formula

$R^3$ is hydrogen, alkyl or phenyl; each of $R^1$ and $R^2$ is alkyl or phenyl; each of $R^4$ and $R^5$, when taken singly, is hydrogen, halogen, alkyl or phenyl; R⁶, when taken singly, is hydrogen, alkyl, phenyl or acyl of the formula

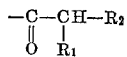

R⁵ and R⁶, when taken collectively with the carbon and nitrogen atoms to which they are attached, are joined saturated alkylene groups completing a heterocyclic ring of 4 to 6 ring atoms; and R⁴ and R⁵, when taken collectively with the carbon atom to which they are attached, are joined saturated alkylene groups completing a carbocyclic ring of 4 to 6 ring carbon atoms.

2. The process which comprises contacting an azinedione of the formula:

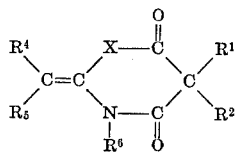

with a basic material at a temperature of about 0° C. to about 450° C. and obtaining a compound of the formula:

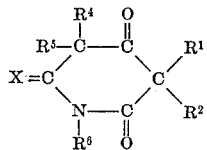

wherein X is oxygen, sulfur or imino of the formula

R³ is hydrogen, alkyl or phenyl; each of R¹ and R² is alkyl or phenyl; each of R⁴ and R⁵, when taken singly, is hydrogen, halogen, alkyl or phenyl; R⁶, when taken singly, is hydrogen, alkyl, phenyl or acyl of the formula

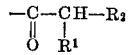

R⁵ and R⁶, when taken collectively with the carbon and nitrogen atoms to which they are attached, are joined saturated alkylene groups completing a heterocyclic ring of 4 to 6 ring atoms; and R⁴ and R⁵, when taken collectively with the carbon atom to which they are attached, are joined saturated alkylene groups completing a carbocyclic ring of 4 to 6 ring carbon atoms.

3. A process according to claim 2 in which the substituent X is oxygen or sulfur.

4. A process according to claim 1 in which the substituent X is oxygen or sulfur.

References Cited

UNITED STATES PATENTS

| | | | |
|---|---|---|---|
| 2,678,315 | 5/1954 | Frederick | 260—281 |
| 2,702,293 | 2/1955 | Hoffman | 260—293.4 |
| 3,140,287 | 7/1964 | Elam | 260—281 |

NICHOLAS S. RIZZO, *Primary Examiner.*

DONALD G. DAUS, *Assistant Examiner.*